(12) United States Patent
Coman et al.

(10) Patent No.: US 9,887,873 B2
(45) Date of Patent: *Feb. 6, 2018

(54) CUSTOM RENDERING OF WEB PAGES BASED ON WEB PAGE REQUESTS

(71) Applicant: Microsoft Corporation, Redmond, WA (US)

(72) Inventors: Mihai Octavian Coman, Little Rock, AR (US); John Ronald Berkeley, Kenmore, WA (US); Ethan Gur-esh, Redmond, WA (US); Oguz Mut, Redmond, WA (US); Adri Verlaan, Seattle, WA (US); Yuan Gao, Bellevue, WA (US); Rahul Ramesh Deshpande, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 513 days.

This patent is subject to a terminal disclaimer.

(21) Appl. No.: 14/133,976

(22) Filed: Dec. 19, 2013

(65) Prior Publication Data

US 2014/0108945 A1    Apr. 17, 2014

Related U.S. Application Data

(63) Continuation of application No. 13/275,346, filed on Oct. 18, 2011, now Pat. No. 8,627,204.

(51) Int. Cl.
*G06F 17/22* (2006.01)
*H04L 12/24* (2006.01)
(Continued)

(52) U.S. Cl.
CPC ...... *H04L 41/0246* (2013.01); *G06F 17/3089* (2013.01); *G06F 17/30905* (2013.01); *H04N 21/8586* (2013.01)

(58) Field of Classification Search
CPC .......... G06F 17/30905; G06F 17/3089; H04L 41/0246; H04L 67/02; H04N 21/8586; H04N 21/4622
See application file for complete search history.

(56) References Cited

U.S. PATENT DOCUMENTS 6,026,433 A * 2/2000 D'Arlach ................ G06F 17/24
707/999.01
6,029,175 A * 2/2000 Chow ............... G06F 17/30899
(Continued)

FOREIGN PATENT DOCUMENTS

CN    101778168 A    7/2010
CN    101808110 A    8/2010
(Continued)

OTHER PUBLICATIONS

Bila, et al., "PageTailor: Reusable End-User Customization for the Mobile Web", Retrieved at <<http://www.usenix.org/events/mobisys07/full_papers/p16.pdf>>, Proceedings of the 5th international conference on Mobile systems, applications and services (MobiSys), Jun. 11-14, 2006, pp. 16-29.
(Continued)

*Primary Examiner* — Maikhanh Nguyen
(74) *Attorney, Agent, or Firm* — Liang IP, PLLC

(57) ABSTRACT

Web page optimization systems and methods are disclosed herein. In one implementation, a number of master pages and page layouts used to generate the web pages are defined. A number of channels are then defined to be associated with certain ones of the master pages and the page layouts. User device generating the request, a browser used to generate the request, or other suitable components of a user agent string in a web page request is then identified. A web page is dynamically rendered in response to the identified components of the user agent string using the master page and the
(Continued)

page layout associated with a channel identified by such components of the web page request.

20 Claims, 7 Drawing Sheets

(51) Int. Cl.
*G06F 17/30* (2006.01)
*H04N 21/858* (2011.01)

(56) References Cited

U.S. PATENT DOCUMENTS

| | | | | |
|---|---|---|---|---|
| 6,148,330 | A * | 11/2000 | Puri | G06F 17/30867 |
| | | | | 707/E17.109 |
| 6,278,448 | B1 * | 8/2001 | Brown | G06F 3/0481 |
| | | | | 715/866 |
| 6,341,316 | B1 * | 1/2002 | Kloba | G06F 17/30902 |
| | | | | 707/E17.12 |
| 6,421,717 | B1 * | 7/2002 | Kloba | G06F 17/30902 |
| | | | | 709/219 |
| 6,424,981 | B1 * | 7/2002 | Isaac | G06F 17/3089 |
| | | | | 707/E17.109 |
| 6,553,412 | B1 * | 4/2003 | Kloba | G06F 17/30902 |
| | | | | 707/E17.12 |
| 7,263,547 | B2 * | 8/2007 | Kloba | G06F 17/30902 |
| | | | | 345/557 |
| 7,293,034 | B2 * | 11/2007 | Paya | G06F 17/3089 |
| 7,392,308 | B2 * | 6/2008 | Aufricht | G06F 3/0481 |
| | | | | 707/E17.12 |
| 7,409,710 | B1 | 8/2008 | Uchil et al. | |
| 7,509,374 | B2 | 3/2009 | Trinh et al. | |
| 7,567,575 | B2 * | 7/2009 | Chen | H04L 29/06027 |
| | | | | 370/338 |
| 7,627,648 | B1 * | 12/2009 | Mehta | G06F 17/30905 |
| | | | | 709/217 |
| 7,840,648 | B1 * | 11/2010 | Rosenstein | G06F 17/24 |
| | | | | 709/218 |
| 8,078,989 | B2 | 12/2011 | Parkinson | |
| 8,126,963 | B1 * | 2/2012 | Rimmer | H04L 63/0823 |
| | | | | 709/246 |
| 2002/0116534 | A1 * | 8/2002 | Teeple | H04L 29/06027 |
| | | | | 709/246 |
| 2002/0120779 | A1 * | 8/2002 | Teeple | H04L 29/06027 |
| | | | | 709/246 |
| 2004/0255233 | A1 | 12/2004 | Croney et al. | |
| 2005/0187895 | A1 * | 8/2005 | Paya | G06F 17/3089 |
| 2006/0031417 | A1 * | 2/2006 | Narin | H04L 67/02 |
| | | | | 709/219 |
| 2006/0048051 | A1 | 3/2006 | Lazaridis | |
| 2006/0230344 | A1 * | 10/2006 | Jennings | G06F 17/30899 |
| | | | | 715/201 |
| 2007/0061486 | A1 * | 3/2007 | Trinh | G06F 17/30905 |
| | | | | 709/246 |
| 2008/0052630 | A1 | 2/2008 | Rosenbaum et al. | |
| 2008/0134031 | A1 | 6/2008 | Aufricht et al. | |
| 2008/0140766 | A1 | 6/2008 | Mohan | |
| 2008/0153467 | A1 * | 6/2008 | Wyler | H04L 67/42 |
| | | | | 455/414.2 |
| 2008/0172608 | A1 | 7/2008 | Patrawala et al. | |
| 2008/0250310 | A1 | 10/2008 | Chen et al. | |
| 2009/0037724 | A1 | 2/2009 | Carion et al. | |
| 2009/0044098 | A1 | 2/2009 | Wyler et al. | |
| 2009/0063619 | A1 | 3/2009 | Chijiiwa | |
| 2010/0077321 | A1 | 3/2010 | Shen et al. | |
| 2010/0174974 | A1 | 7/2010 | Brisebois et al. | |
| 2010/0312821 | A1 | 12/2010 | Bannoura et al. | |
| 2011/0083069 | A1 | 4/2011 | Paul et al. | |
| 2011/0099467 | A1 | 4/2011 | Kapur et al. | |
| 2012/0167047 | A1 * | 6/2012 | Wyler | H04W 4/00 |
| | | | | 717/122 |

FOREIGN PATENT DOCUMENTS

| | | |
|---|---|---|
| JP | 2002259283 A | 9/2002 |
| JP | 2004510254 A | 4/2004 |
| WO | 2010094927 A1 | 8/2010 |

OTHER PUBLICATIONS

Bickmore, et al., "Web Page Filtering and Re-Authoring for Mobile", Retrieved at <<http://citeseerx.ist.psu.edu/viewdoc/download?doi=10.1.1.90.4630&rep=rep1&type=pdf, The Computer Journal, vol. 42, No. 6, Apr. 21, 1999, pp. 534-546.
"International Search Report", Mailed Date:Mar. 28, 2013, Application No. PCT/US2012/060689, Filed date: Oct. 17, 2012, pp. 9.
"Second Office Action Issued in Chinese Patent Application No. 201210395820.6", Mailed Date: Oct. 19, 2015, 10 Pages.
"Supplementary Search Report Received for European Patent Application No. 12841680.7", Mailed Date: Apr. 23, 2015, 6 Pages.
"Maxthon, Method for Modifying User Agent", Published on: Jan. 6, 2011, Available at: http://www.966266.com/iishu/maxthon-user-agent-weizao.html.
Zhongwang, et al., "Research on Cookie Applications and Personal Information Security", In Proceeding of the Computer Applications and Software, vol. 24, Issue 3, Mar. 2007, 6 Pages.
"First Office Action Issued in Chinese Patent Application No. 201210395820.6", Mailed Date: Feb. 4, 2015, 14 pages.
"Office Action Issued in Japanese Patent Application No. 2014-537192", Mailed Date: Nov. 4, 2016, 9 Pages.
"Non Final Office Action Issued in U.S. Appl. No. 13/275,346", Mailed Date: Mar. 7, 2013, 16 Pages.
"Notice of Allowance Issued in U.S. Appl. No. 13/275,346", Mailed Date: Sep. 5, 2013, 16 Pages.
"Decision of Refusal Issued in Japanese Patent Application No. 2014-537192", dated Jun. 30, 2017, 9 Pages.
Yamada, Yoshihiro, "Misemasu! Shinka o tsuzukeru ASP.NET 2.0 no shin-kinou, Yori tsukaiyasuku, yori tsukuriyasuku, yori powerful na gijyutsu", In Windows Developer Magazine, vol. 11, Issue 3, Published by Shoeisha Co. Ltd., pp. 212-226., Jul. 1, 2005.
Daigo, Ryuuich, "Dai-3-shou Master Page to Theme in ASP.NET 2.0", In Magazine .NET Expert, vol. 01, Published by Gijutsu-Hyohron Co. Ltd., 15 Pages, Sep. 1, 2005.

* cited by examiner

CUSTOM RENDERING OF WEB PAGES BASED ON WEB PAGE REQUESTS

CROSS-REFERENCE TO RELATED APPLICATION(S)

This application is a continuation of and claims priority to U.S. patent application Ser. No. 13/275,346, filed on Oct. 18, 2011.

BACKGROUND

With the proliferation of the smartphones and other mobile devices capable of accessing the Internet, users are accessing websites more frequently using such mobile devices. However, because the majority of the websites are designed so as to be accessed by computers, users accessing such websites end up having less efficient and less satisfactory experience. One approach to ensure that each of the different users accessing a website from the different devices can use the website efficiently is to provide different websites for different devices. For example, a user accessing a website www.thisone.com is redirected to a different website having the address of m.thisone.com. However, such approach has several disadvantages, including, unnecessary content duplication, inefficient marketing, lower search engine rankings, etc.

Another approach is to allow the application of different cascading style sheets (CSS) by the end users' browsers based on the factors such as the screen size of the end user, etc. This approach relies on the browser to determine how the content is displayed to the end user and therefore the developer of the website relying on the CSS has less control on the presentation of the content. Furthermore, all of the content needs to be sent to the browser even if some of such content is not displayed to the end user, which adds inefficiencies to the communication of the content. Yet another approach is to use the tools that automatically refactor the content and the presentation format based on the identity of the device accessing the website. However, this approach also does not provide the designer of the website full control over the resulting look and feel of how the website is presented to the user on different devices. Thus, this approach is designed to address only the bandwidth problem without providing adequate design choice to the developer of the website.

SUMMARY

Implementations described and claimed herein address the foregoing problems by providing a web page optimization system that allows a user to generate web pages that are optimized for use with different user devices. In one implementation of the web page optimization system, a number of master pages and page layouts used to generate the web pages are defined, with each of the master pages defining generalized regions shared by all pages of a website and each of the page layouts defining the content and the arrangement of such content on the web pages. The web page optimization system also defines a number of channels and associates the master pages and the page layouts to the channels. Each of the channels is associated with a user device. The web page optimization system identifies components the user agent string of a web page request, such as the user device generating the request, the browser used to generate the request, etc., and renders a web page in response to such web page request using the master page and the page layout associated with the channel identified by such components of the web page request.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

The web page optimization system disclosed herein provides the custom optimization of web pages displayed to a large variety of devices and browsers. Specifically, the web page optimization system identifies the device that is used by a user to generate a web page request, and based on the identification of the device, the system selects a custom master page and a custom page layout that can be used to render a web page to the requesting device. For example, if the requesting device is identified as a mobile device, a master page with smaller and less data intensive header, footer, etc., is selected for generating the web page to be sent to the requesting mobile device. Similarly, a page layout with data that is optimized for display on a mobile device is used for generating such a web page. In one implementation, a number of channels are also defined, with each channel associated with a master page and a page layout.

The web page optimization system allows a user to use the same content for generating the web pages optimized for a number of devices such as a mobile phone, a smartphone, a laptop, etc. As a result, user with different devices can access the content from the same web uniform resource locator (URL). Such an approach ensures that any search engine ranking, marketing campaigns, etc., for a website will use the combined web traffic from all users to the website, irrespective of the devices used by the users to access the website. Furthermore, the web page optimization system also provides different level of specificity in defining mobile devices. For example, a general smartphone channel can be provided for generating web pages for all smartphones, while a separate channel for generating web pages for a mobile device using Windows Phone 7 operating systems can also be defined.

Figure 1:
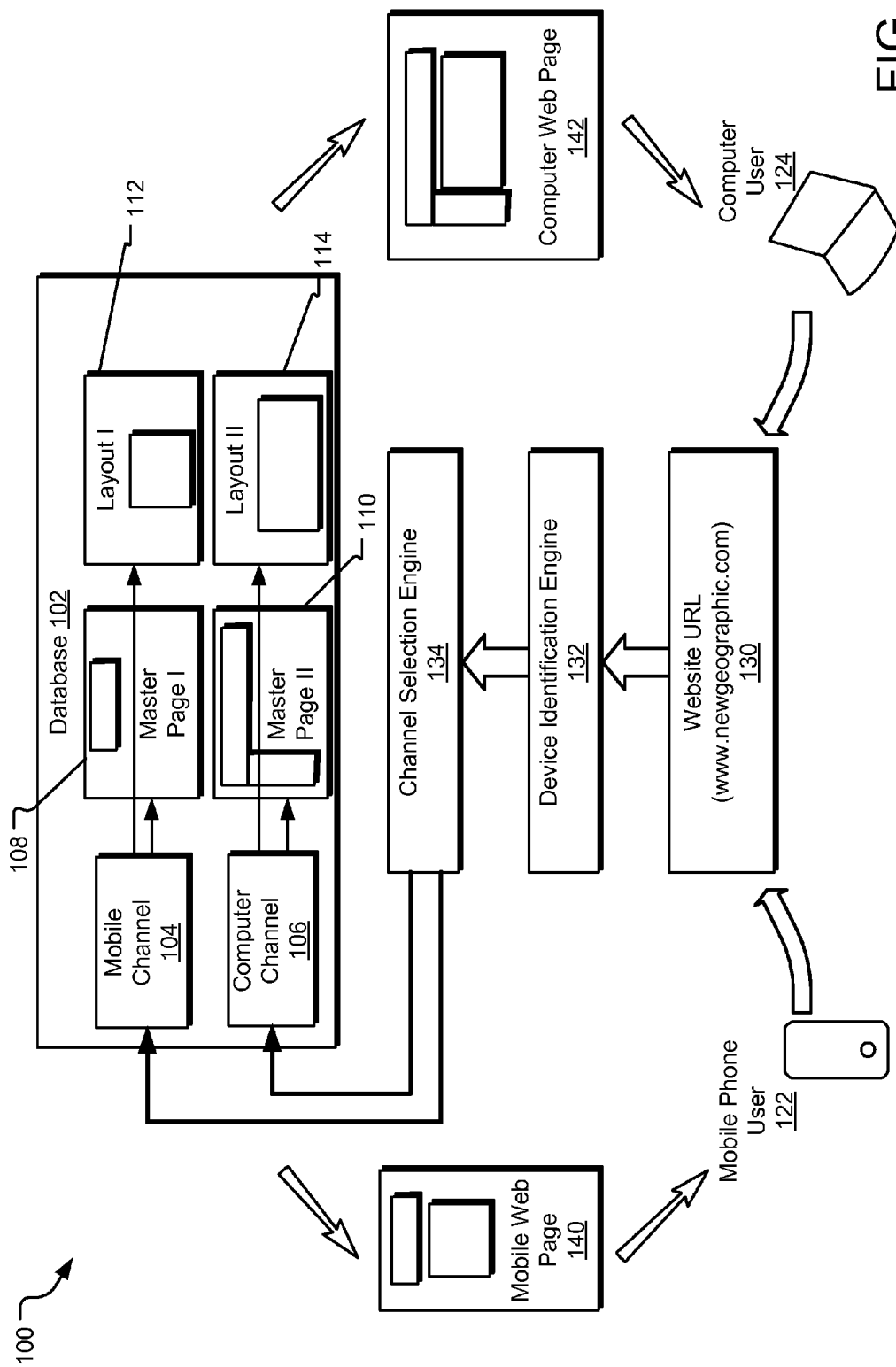
FIG. 1 illustrates the example data sources and flows for a web page optimization system.

FIG. 1 illustrates the example data sources and flows for a web page optimization system 100. Specifically, the web page optimization system 100 is used to render and communicate the web pages for the New Geographic magazine having the URL of www.newgeographic.com. The web page optimization system 100 includes a database 102 that is used to store various template elements used to generate the optimized web pages for the users vising the website of the New Geographic magazine. In one implementation, such template elements include various master pages, various page layouts, etc. For example, the database 102 includes a master page I 108 that provides the generalized regions, such as the headers, shared by all pages of the New Geographic website. Specifically the master page I 108 is used to render the web pages that will be provided to a visitor that is using a mobile phone to visit the website of the New Geographic magazine. Similarly, a master page II 110 provides the generalized regions, such as the headers, the side-bars, the footers, etc., shared by all web pages of the New Geographic website when such pages are provided to a visitor using a computer to visit the website of the New Geographic magazine. Because mobile phones generally have limited amount of viewing space for displaying a web page, the master page I 108 includes only a small header for generating the web pages and no side banner is used. On the other hand, when a user is visiting the New Geographic's website using a computer, the master page II 110 is used to generate the web pages that provide fuller and richer experience to the user.

The database 102 also includes a page layout I 112 that is configured for displaying the content on a mobile phone and a page layout II 114 that is configured for displaying the content on a computer screen. As illustrated in FIG. 1, a lesser amount of content space is provided on the page layout I 112 compared to the amount of content space provided on the page layout II 114. In one implementation, the page layouts 112 and 114 are provided with a number of panels where the content within the panels is displayed only on certain types of devices. Thus, a panel containing a large amount of numeric data can be identified by a web page developer as the panel that will be included in a web page to be displayed on a computer. However, such numeric data will not be included on a web page to be displayed on a mobile device. The database also includes various channels 104, 106. Each of the various channels 104, 106 is associated with various template elements. For example, the mobile channel 104 is associated with the master page I 108 and the layout I 112, wherein the computer channel 106 is associated with the master page II 110 and the layout II 114.

In one implementation, the database 102 is hosted on a webserver that serves the web pages to the users when they visit the website for the New Geographic magazine. When a user requests a web page, the user also sends various other information about the user, such as the device used by the user to visit the web page, other information identifying the user, etc. An example of such information is a hypertext transfer protocol (http) user agent string sent from the user device browser to the webserver providing the web pages. For example, when a user accesses the New Geographic magazine's website using a browser, an http request including a user string with the URL of www.newgeographic.com 130 is sent to the webserver hosting the website. A user agent string included in the http request include various information identifying the user, such as the browser used by the user, the device used by the user, the geographic location of the user, etc. Thus, for example, when the mobile phone user 122 sends a request to access the New Geographic magazine's website, the user agent string attached to such a request includes information identifying the device used by the mobile phone user 122, the browser used by the mobile phone user 122, etc. An example of such a user agent string is as follows:

User Agent String I

Mozilla/5.0 (Linux; U; Android 2.2.1; en-us; Nexus One Build/FRG83) AppleWebKit/533.1 (KHTML, Like Gecko) Version/4.0 Mobile Safari/533.1

The above User Agent String I identifies that the request sent from the mobile phone user 122 identifies the device as using "Mobile Safari" as the browser. On the other hand, when a computer user 124 sends a request to access the New Geographic magazine's website, the user agent string attached to such a request will include different components or component values. An example of such a user agent string is as follows:

User Agent String II

Mozilla/4.0 (Compatible; MSIE 8.0; Windows NT 6.1; Trident/4.0)

Once a request to access the website is received, a device identification engine 132 parses such request and analyzes the various components of the user agent string. Thus, upon receiving the User Agent String I, the device identification engine 132 identifies the user device as an Android™ mobile device using the Safari™ web browser. On the other hand, when the User Agent String II is received, the device identification engine 132 identifies the user device as a computer using the Internet Explorer™ 8 as the web browser. Subsequently, a channel selection engine 134 selects a channel based on the identification of the user device. For example, if the user device is identified as a mobile device, the channel selection engine 134 selects the mobile channel 104. On the other hand, if the user device is identified as a computer, the channel selection engine 134 selects the computer channel 106.

Once the channel selection engine 134 selects a channel, a master page and a page layout associated with the selected channel are used to render a web page that will be provided to the user. For example, if the mobile channel 104 is selected, the master page I 108 and the layout I 112 are used to render a mobile web page 140. On the other hand, if the computer channel 106 is selected, the master age II 110 and the layout II 114 are used to render a computer web page 142. In one implementation, the rendered web pages 140 and 142 are cached for future use so that when any other users request the web pages from the website of the New Geographic magazine, such web pages can be delivered without having to assemble the master pages, the layouts, and the content. Furthermore, anytime there is any change in the content of the web pages, all of the web pages 140 and 142 can be automatically generated and stored in the cache for future use. Such simultaneous caching and updating of the web pages enhances the performance of the web page optimization system 100. Once the web pages are cached, the server hosting the website and the database 102 determines whether a particular request from another user can be served from the cache. In one implementation, if it is determined that the particular request cannot be served from cache, the system renders all of the web pages 140, 142 again.

While the illustrated implementation of the web page optimization system 100 only discloses two channels, additional channels, such as a tablet channel to serve tablet devices such as an iPad™, etc., can also be provided. Moreover, while the illustrated implementation of the web page optimization system 100 only discloses one mobile channel 104 that is selected for all mobile devices, in an alternative implementation, different channels are provided for different types of mobile devices. Thus, in such an implementation, a separate channel is provided for Apple™ smartphones, for Windows™ smartphones, for Android™ Smartphones, etc. Yet alternatively, an implementation of the web page optimization system 100 includes channels that are identified based on the browser used to access the web pages. Thus, for example, separate channels serve Firefox™ browsers, Internet Explorer™ browsers, Safari™ browsers, etc.

It is also possible that in some situations, when the device identification engine 132 parses a user agent string, it will identify a user device or a user browser for which there is no designated channel. To address such a situation, an implementation of the database 102 designates one of the channels 104, 106 as the default channel, which is selected in the cases where no other channels can be selected based on the information available from user agent strings. Yet alternatively, the web optimization system 100 also designates a default master page, a default layout, etc.

While the web optimization system 100 is illustrated to have different channels that are selected based on device type, browser type, etc., in an alternative implementation, different channels are selected based on other information received from the user request. For example, if a user request also includes a cookie with other information identifying a user, such as the geographic location of the user, etc., and if the web optimization system 100 has the permission to use such user identifying information, a particular channel is selected using such user identifying information.

Furthermore, while the web page optimization system 100 illustrates each of the channels 104, 106 to have one master page and one layout associated to such channels, in an alternate implementation one master page is used by more than one channels. Yet alternatively, multiple channels can be associated with the same master page but with different layouts. This gives the designer of the database 102 the flexibility to designate a large number of channels, even when the designer has not developed the templates for each of such channels. The number of channels that a user can create can be determined based on various optimization and efficiency criteria.

An implementation of the web optimization system 100 provides a number of override rules. For example, an override rule provides that even if the channel selection engine 134 selects the mobile channel 104 to server a web request, if the web request or a cookie suggests that the user is interested in the computer web page 142, the web request is associated with the computer channel 106. Yet alternatively, such override rule can also request different combination of the master pages and the layouts. Thus, an example user override requests a web page generated using the master page I 108 and the layout II 114. In such a case, the web optimization system 100 will generate such a web page and cache it for the future use. Furthermore, a hierarchy for the override rules is also provided so that if more than one override requests are received, the web page optimization system 100 prioritizes among such requests.

Using the override capabilities of the web optimization system 100, a user can request a version of a web page that is different from the web page generated based on the data from the user agent string. For example, when a user using an iPad™ requests a web page, based on the user agent string, the channel selection engine 134 selects a tablet channel. However, the user can use a cookie to inform the web optimization system 100 that the user is interested in receiving the computer web page 142, in which case, the computer channel 106 is selected. Furthermore, because cookies are persistent, the web optimization system 100 remembers the choice identified by the cookie.

An alternative implementation of the web optimization system 100 also provides a programmability hook that allows the web site developers to plug-in custom logic. For example, a developer can use some custom logic to make a channel perform a function that suits the developer's custom needs. Such programmability hooks can also be used to alter an argument or behavior of the web page optimization system 100. In one implementation, such programmable hooks allow a developer to select a combination of a master page and a layout for generating web pages in response to detecting that the user is accessing the website using a particular application, such as an App for the iPhone™. Alternatively, a developer can override a channel selection based on detecting the size of the device screen as implied by the user agent string of the web page request.

For allowing the developers to view the various web pages 140, 142, during the development stage of the master pages and the layouts, the web optimization system 100 also provides the users the capability to simulate various web page renderings. For example, during the development mode, even if the developer sends a request to the web optimization system 100 using a computer, the developer can specify that the mobile web page 140 be rendered. An implementation also provides a simulation application that will display the mobile web page 140 on a simulated mobile device screen on a computer.

Figure 2:
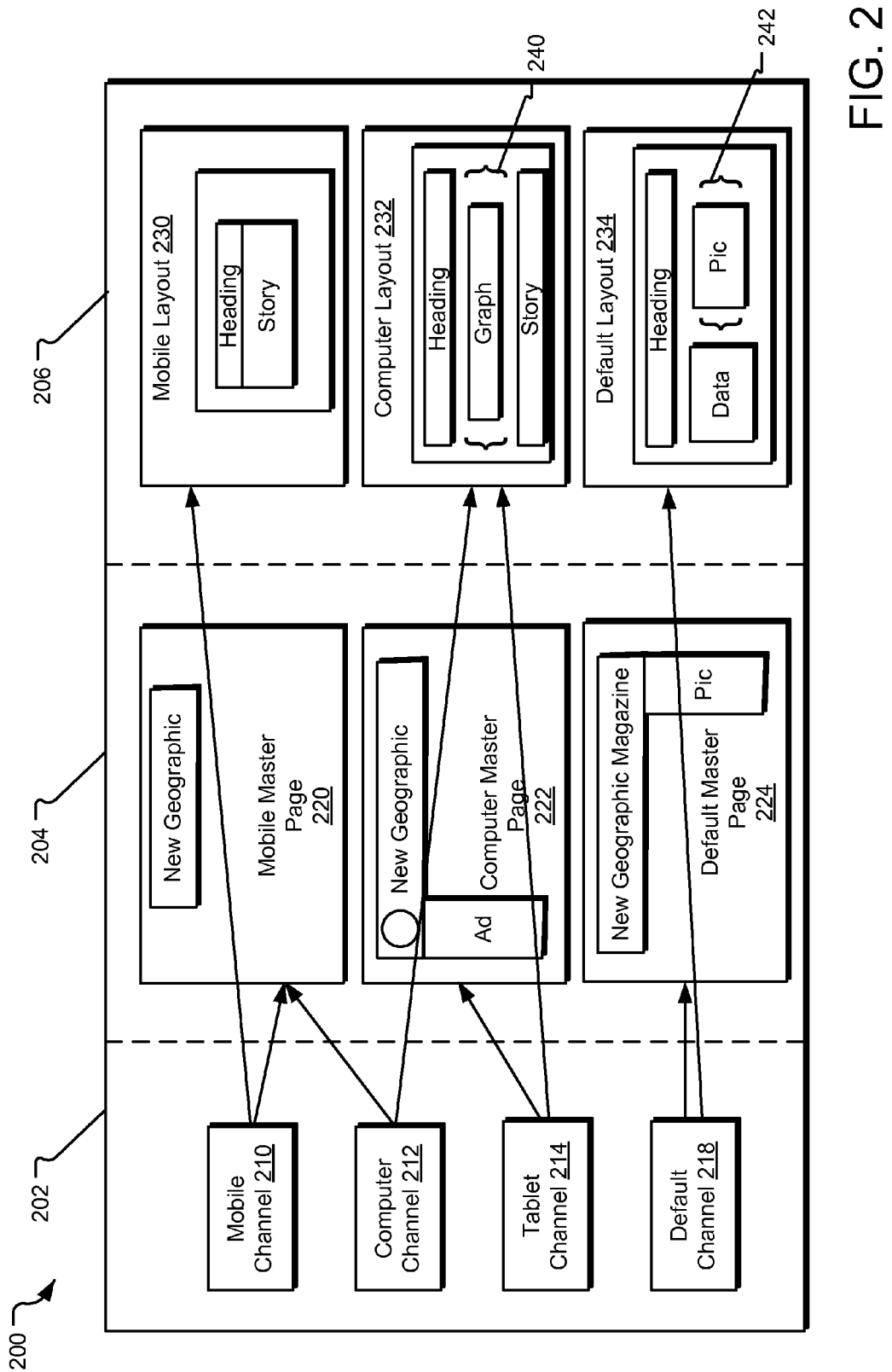
FIG. 2 illustrates an example of a web elements database.

FIG. 2 illustrates an example elements database 200 used in a web page optimization system used by the New Geographic magazine webserver. The elements database 200 associates a number of channels 202 to the master pages 204 and to the layouts 206. As illustrated, a mobile channel 210 is associated with a mobile master page 220 and a mobile layout 230. Therefore, when the mobile channel 210 is selected based on the components of the user agent string of a web page request, the mobile master page 220 and the mobile layout 230 are used to generate a web page. As illustrated, the mobile master page 220 is designed with a narrower banner that can be easily displayed on a mobile phone. Similarly, the mobile layout 230 is also designed to be compact and without any images, graphs, etc.

On the other hand, when a computer channel 212 is selected based on the components of the user agent string of a web page request, the computer master page 222 and a computer layout 232 are used to generate a web page. The computer master page 222 includes a wider heading, a logo, and an advertisement. Similarly, the computer layout 232 includes an expansive heading for the content as well as a graph to be displayed with the content of a story. The computer layout 232 includes the graph component wrapped in a panel 240. In one implementation of the database 200, the developer of the computer layout 232 provides the rules identifying the types of devices for which the paneled content is displayed. For example, in one particular implementation, the developer defines that the paneled content of the computer layout 232 is displayed only on computers. Alternatively, such rule can be based on the user's browser, as identified by the user agent string. Thus, for example, the graph of the computer layout 232 is displayed only on a browser that supports the Adobe™ Flash player.

The tablet channel 214 is associated with the computer master page 222 and the computer layout 232. While the implementation of database 200 does not have separate master page and a separate layout for the tablet channel 214, a tablet master page and a tablet layout can be added at a later stage and associated with the tablet channel 214. The database 200 also includes a default channel 218. When a user agent string is unable to identify the device, browser, etc., that generates a web page request; the default channel 218 is used to select a default master page 224 and a default layout 234 to render web pages. As in the computer layout 232, part of the content to be displayed by the default layout 234 is wrapped in the panel 242. In such a case, a developer of the default layout can specify rules regarding the displaying of the paneled picture.

While the elements database 200 is illustrated to associate channels 202 to various web page elements 204, 206, in an alternative implementation, other fields are also provided. For example, in one alternative implementation, each of the channels 202 is related a device. Thus, an iPad™ is related to the tablet channel 214, a Blackberry™ phone is related to the mobile channel 210, etc. Even though the elements of the database 200 are illustrated as graphs, in practice, the database can be configured to only include pointers to objects representing the elements of the database 200.

Figure 3:
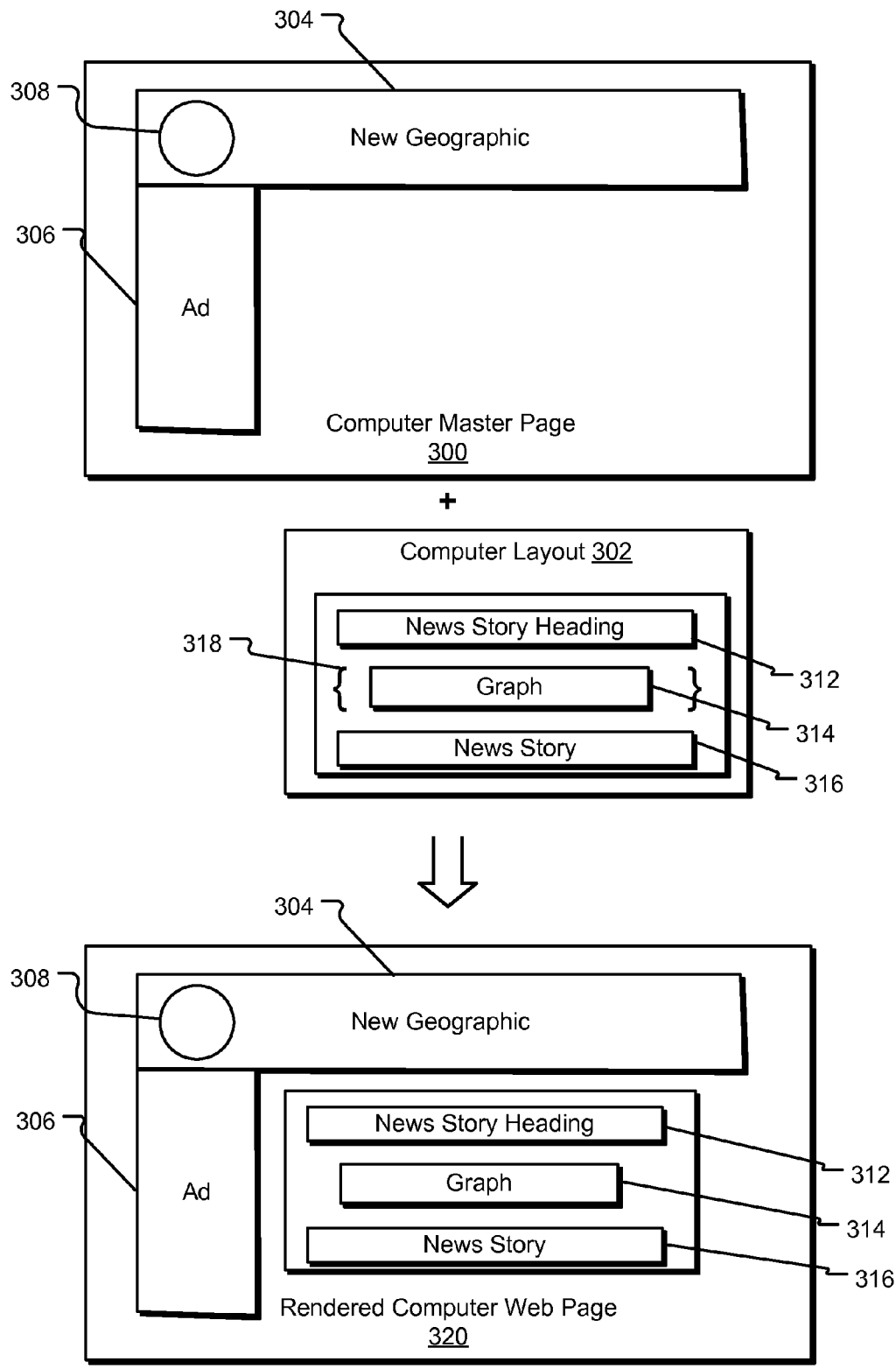
FIG. 3 illustrates example master page, an example page layout and an example rendered web page.

FIG. 3 illustrates an example computer master page 300 and an example computer layout 302 for a web page optimization system. Specifically, the computer master page 300 provides generalized regions shared by all pages on a website, such as a header 304, a sidebar 306 with an advertisement, and a logo 308. On the other hand, the layout 302 is a secondary visual template that provides structure to the content of individual web pages. For example, for a web page displaying a news story, the layout 302 provides the positioning, the style, etc., for the various components of such a story, including a news story heading 312, a graph 314 relating to the news story, and the content of the news story 316. The graph component 314 of the computer layout 302 is wrapped in panels 318 such that a web page developer can define rules regarding when such paneled components are to be displayed on a web page.

The computer master page 300 and the computer layout 202 are combined to generate a rendered computer web page 320. In this particular instance the graph 314 is displayed on the rendered computer web page 320. This could be due to the rule attached to the panel 318 that specifies that the content wrapped in the panel 318 should be displayed on a computer web page. However, if the rule specifies that the content wrapped in the panel 318 should not be displayed on a mobile web page, a mobile web page generated using the computer layout 302 will not include the graph 314.

Figure 4:
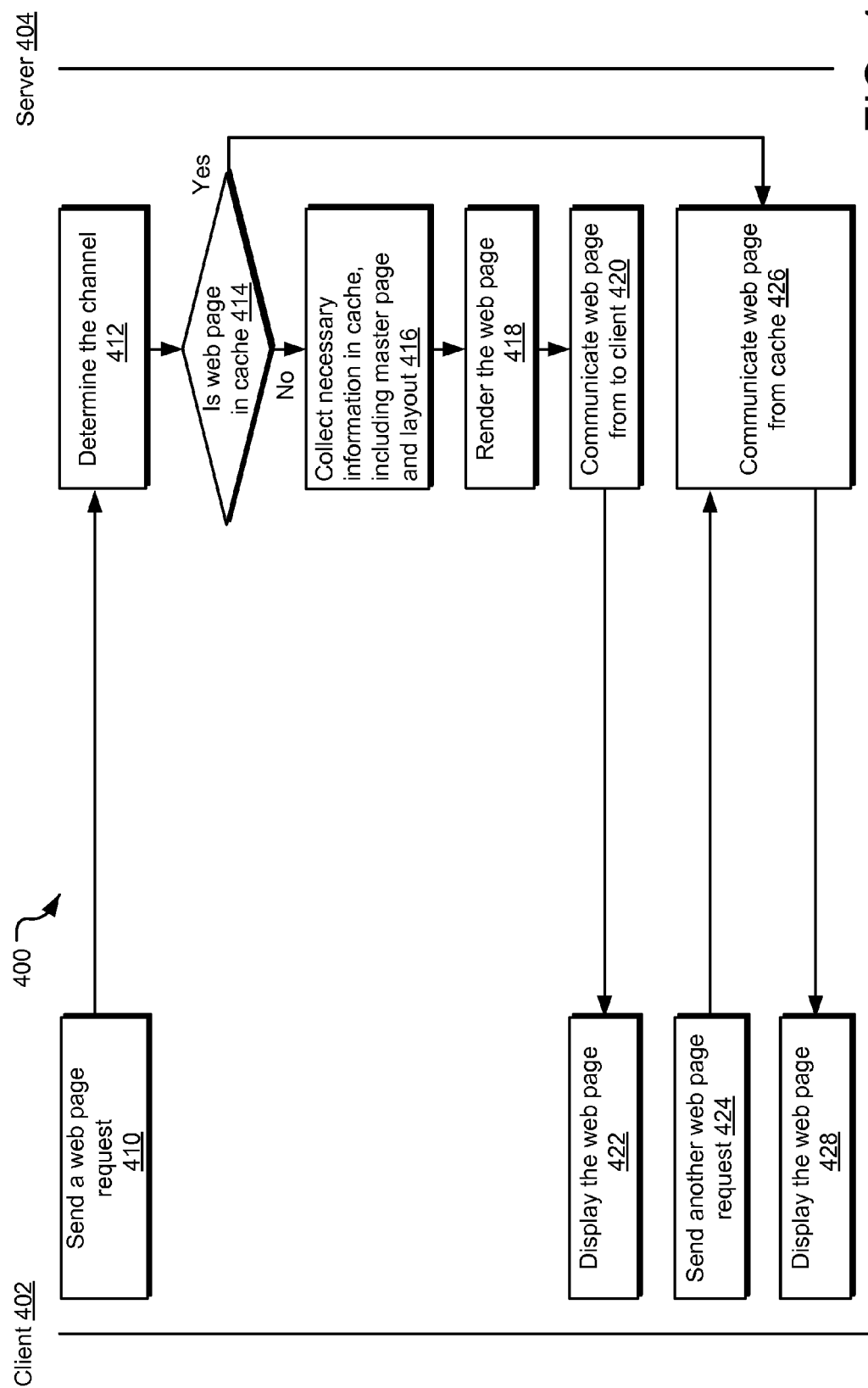
FIG. 4 illustrates example of communications between client and a web server.

FIG. 4 illustrates the example communications 400 between a client 402 requesting a web page and a server 404 providing the web pages of a website. The client 402 sends a web page request 410 to the server 404. Such a web page request 410 is generated in response to, for example, a user typing the URL of the website in a browser, a user clicking on the link for the website, the user activating an application on a smartphone, etc. The web page request 410 includes a user agent string including information that identifies the user device, the user browser, etc. In an implementation, the user agent string also includes a cookie or information identifying a cookie. At 412, the server 404 determines the channel that should be associated with the client's we page request. For example, if the server 404 determines that the requesting device is a mobile device, a mobile channel is associated with the web page request.

Subsequently, at 414, the server 404 determines if there is a web page in the cache that can be used to service the web page request 410. If the server 404 has served a client using a similar device in recent past, the server's cache will have the requested web page and the server 404 uses such web page from the cache to respond 426 to the web page request 410. If no web page is found in the cache, at 416, the server collects information that is necessary to service the web page request 410. Such information include, the master page associated with the identified channel, the layout associated with the identified channel, the content associated with the identified master page and the identified layout, etc. Using the collected information, at 418, the server renders the web page. The rendered page is communicated to the client 402 at 420 and the client 402 displays the web page to a user at 422. Subsequently, at 424, if another client sends a web page request to the server 404, the server 404 communicates 426 the rendered web page from cache to the client 402 and the client displays the web page at 428.

Figure 5:
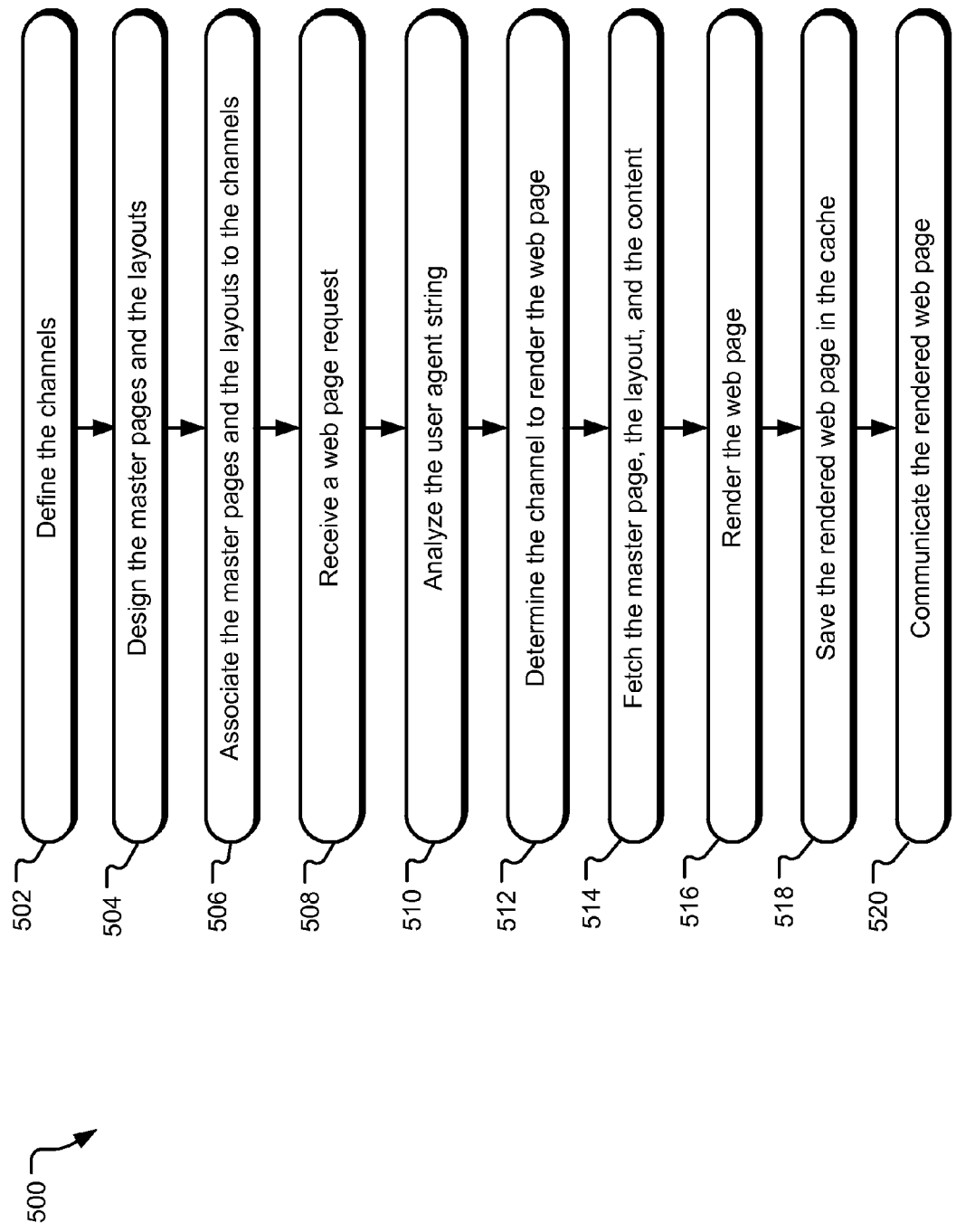
FIG. 5 illustrates example operations for a web page optimization system.

FIG. 5 illustrates example operations 500 for a web page optimization system. An operation 502 defines various channels that will be used to serve the client web page requests. For example, a mobile channel, a laptop channel, a desktop channel, etc., are defined. Alternatively, channels can also be defined based on other parameters, such as the screen size of the client device, the browser used by the client device, etc. An operation 504 designs the master pages and the layouts used to render the web pages. In an alternative implementation, the page layouts include display templates used by certain layout regions displaying repeating content and optimized for display on various devices. For example, different display templates can be used for rendering such repeating content on different devices in different manner. Additionally, page content can also be optimized by adding the device specific content on the web page layouts. For example, a page layout includes a content that will not be shown on certain devices by enclosing the content in virtual containers, wrapping such content in panels, and defining rules for displaying the content from the panels or the virtual containers.

Subsequently, an operation 506 associates the master pages and the layouts to the channels. For example, a tablet channel can be associated with a computer master page and a mobile page layout. An operation 508 receives a web page request from a client for a web page. For example, such as request is an http request that identifies the URL of a website or the specific web pages. Such a web page request often includes a user agent string including the information identifying the requesting device, the requesting browser, etc. An operation 510 analyzes the user agent string attached to the web page request to determine such user identifying information.

Based on the information from the user agent string, an operation 512 determines a channel that will be used to generate the requested web page. For example, if the user agent string identifies the requesting device as an iPad™, the operation 512 determines that it can use the tablet channel to gather the components and the content of the web page that will be sent to the requesting device. An operation 514 fetches the components such as the master page, the layout, and the content from a database on the web server.

Subsequently, an operation 516 renders the web page by putting together the various components and the content. An operation 518 saves the rendered web page in a cache. Such saved web pages can be used to service future requests from other users. The rendered web page is communicated by an operation 520 to the requesting device. The requesting device receives the rendered web page from the same web address that the requesting device initially used for generating such web page request. Thus, the operations 500 do not involve any redirecting of the user's request to other URL addresses.

Figure 6:
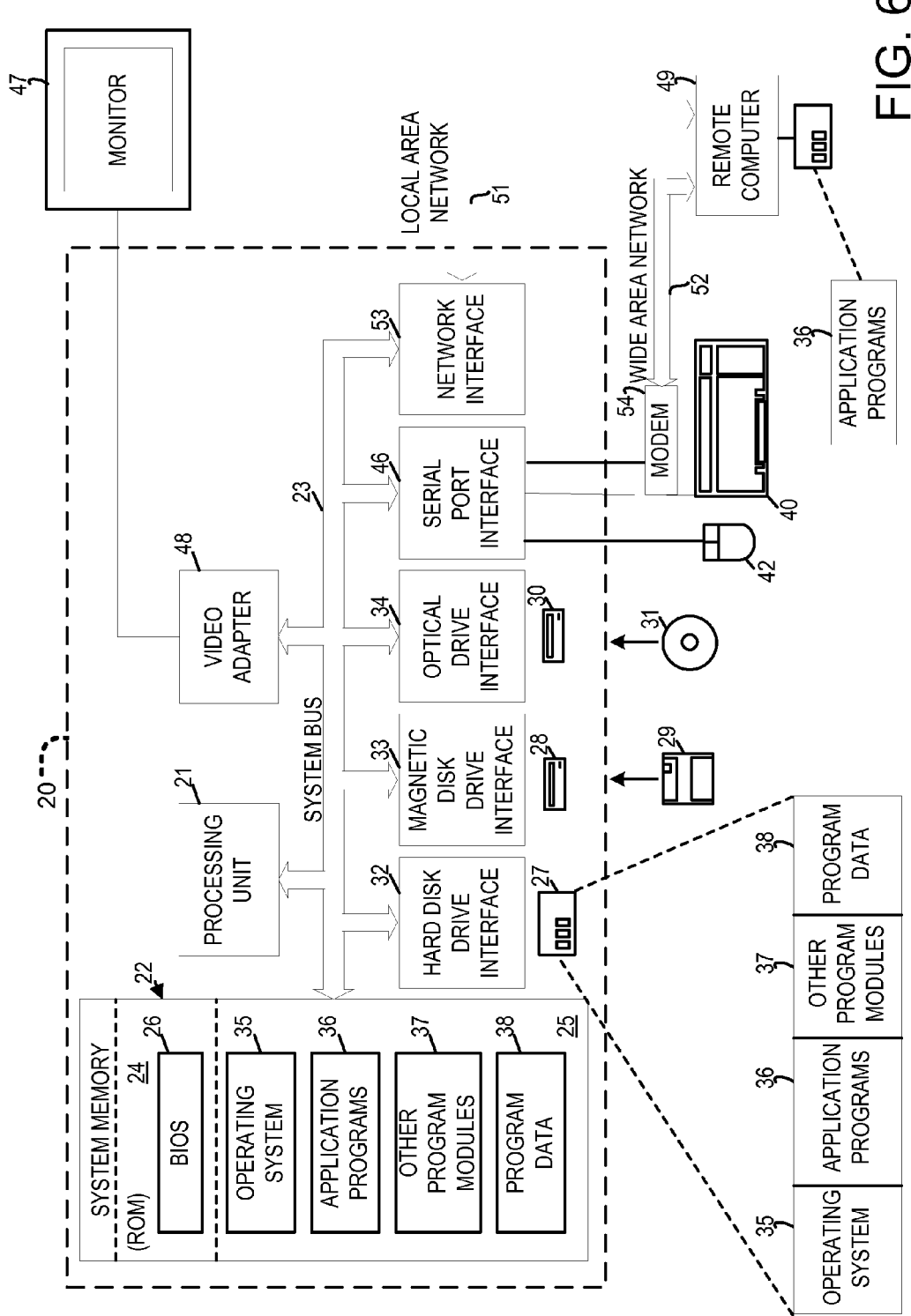
FIG. 6 illustrates an example system that may be useful in implementing the described technology.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, various components of a web page optimization system may be embodied by instructions stored in memory 22 and/or storage devices 29 or 31 and processed by the processing unit 21. The web page element database, master pages, page layouts, and other data may be stored in memory 22 and/or storage devices 29 or 31 as persistent datastores. Further, a web page optimization system represents hardware and/or software configured to provide service functionality for network-connected systems. Such services may be implemented using a general purpose computer and specialized software (such as a server executing service software), a special purpose computing system and specialized software (such as a mobile device or network appliance executing service software), or other computing configurations.

Figure 7:
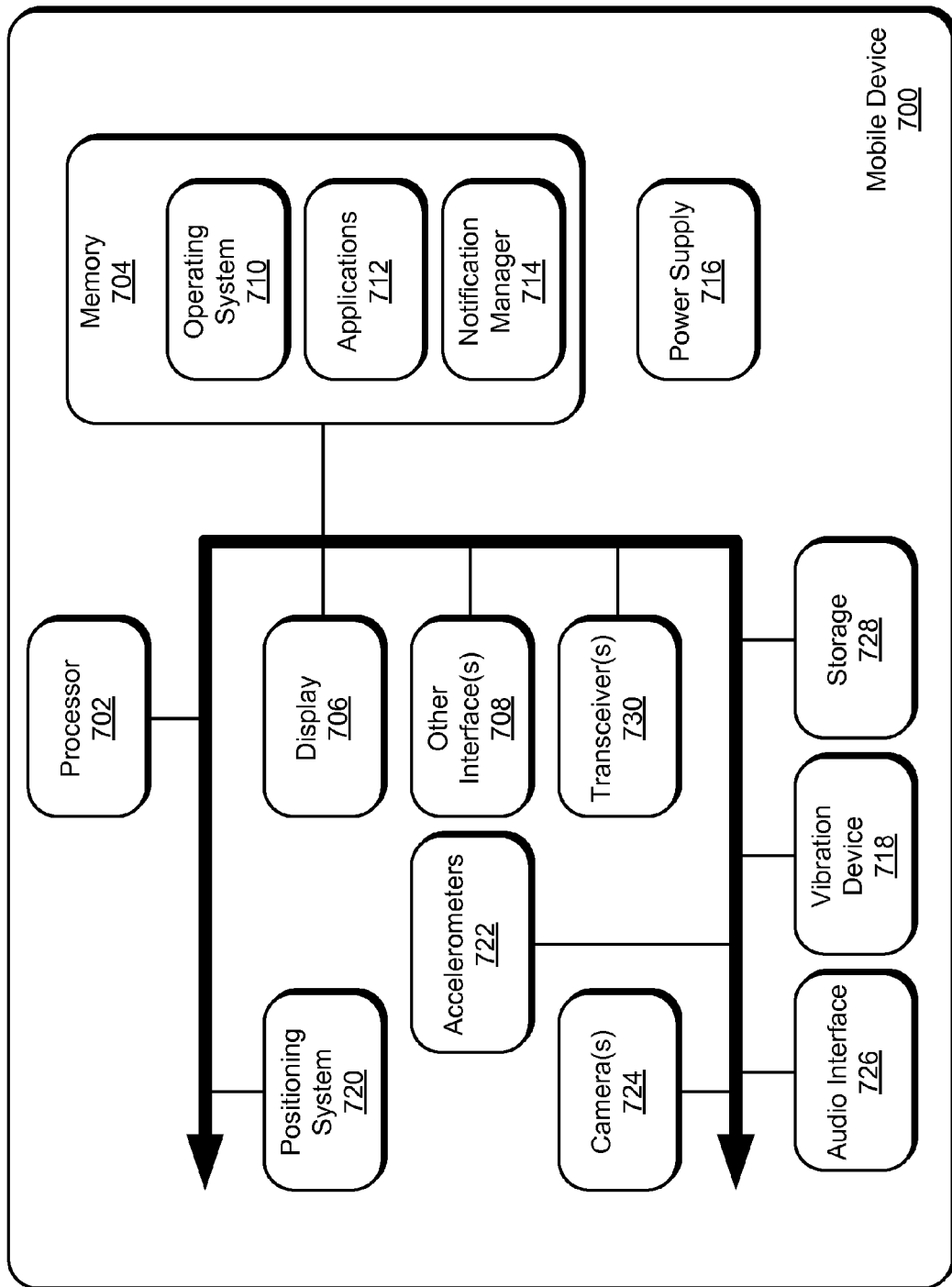
FIG. 7 illustrates another example system that may be useful in implementing the described technology.

FIG. 7 illustrates another example system (labeled as a mobile device 700) that may be useful in implementing the described technology. The mobile device 700 includes a processor 702, a memory 704, a display 706 (e.g., a touchscreen display), and other interfaces 708 (e.g., a keyboard). The memory 704 generally includes both volatile memory (e.g., RAM) and non-volatile memory (e.g., flash memory). An operating system 710, such as the Microsoft Windows® Phone 7 operating system, resides in the memory 704 and is executed by the processor 702, although it should be understood that other operating systems may be employed.

One or more application programs 712 are loaded in the memory 704 and executed on the operating system 710 by the processor 702. Examples of applications 712 include without limitation email programs, scheduling programs, personal information managers, Internet browsing programs, multimedia player applications, etc. A notification manager 714 is also loaded in the memory 704 and is executed by the processor 702 to present notifications to the user. For example, when a promotion is triggered and presented to the shopper, the notification manager 714 can cause the mobile device 700 to beep or vibrate (via the vibration device 718) and display the promotion on the display 706.

The mobile device 700 includes a power supply 716, which is powered by one or more batteries or other power sources and which provides power to other components of the mobile device 700. The power supply 716 may also be connected to an external power source that overrides or recharges the built-in batteries or other power sources.

The mobile device 700 includes one or more communication transceivers 730 to provide network connectivity (e.g., mobile phone network, Wi-Fi®, BlueTooth®, etc.). The mobile device 700 also includes various other components, such as a positioning system 720 (e.g., a global positioning satellite transceiver), one or more accelerometers 722, one or more cameras 724, an audio interface 726 (e.g., a microphone, an audio amplifier and speaker and/or audio jack), and additional storage 728. Other configurations may also be employed.

In an example implementation, a web page optimization system, and other modules and services may be embodied by instructions stored in memory 704 and/or storage devices 728 and processed by the processing unit 702. The master pages, the layouts, and other data may be stored in memory 704 and/or storage devices 728 as persistent datastores.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method performed by a web server having a processor and a memory operatively coupled to the processor, the memory containing content retrievable by client devices, the method comprising:
with the processor of the web server,
receiving, at the web server, a web page request for content from a client device via a computer network, the web page request including a user agent string and a universal resource locator ("URL") identifying the web server; and
in response to receiving the web page request for the content, at the web server,
identifying one channel from multiple channels based on at least one component of the user agent string, each of the multiple channels being associated with one or more page layouts configured to present the requested content, at least one of the page layouts being configured to present at least one section of the requested content wrapped in a panel;
dynamically rendering a web page containing the requested content by assembling the requested content from the memory in the one or more page layouts associated with the identified channel; and
transmitting, from the web server, the rendered web page in the one or more page layouts associated with the identified channel to the client device via the computer network without redirection of the web page request to other URL addresses.

2. The method of claim 1 wherein:
the web page request is a first web page request;
the user agent string is a first user agent string; and
the method further includes:
receiving a second web page request for the content, the web page request including a second user agent string having information identifying at least another user device different than the user device; and
identifying another channel from the multiple channels based on at least one component of the second user agent string, the identified another channel having one or more page layouts different than the one channel.

3. The method of claim 1 wherein the web page request identifies an address of the requested content, and wherein the method further includes serving the rendered web page at the address.

4. The method of claim 1 wherein the at least one component of the user agent string identifies at least one of a user device used to generate the web page request or a browser used by the user device to generate the web page request.

5. The method of claim 1 wherein the at least one section of the content is wrapped in the panel associating the at least one section of the content to the identified channel.

6. The method of claim 1 wherein the client device includes one of a computer, a mobile device, or a tablet.

7. A computer system, comprising one or more processors and a memory communicatively coupled to the one or more processors, the memory storing content and instructions that, when executed by the one or more processors, cause the computer systems to perform:
receiving, at the computer system, a web page request for content from a client device via a computer network, the web page request including a user agent string and a universal resource locator ("URL") identifying the computer system; and
in response to receiving the web page request for the content, at the computer system,
identifying one channel from multiple channels based on at least one component of the user agent string, each of the multiple channels being associated with one or more page layouts configured to present the requested content, at least one of the page layouts being configured to present at least one section of the requested content wrapped in a panel;
dynamically rendering a web page containing the requested content by assembling the requested content from the memory in the one or more page layouts associated with the identified channel; and
transmitting, from the computer system, the rendered web page in the one or more page layouts associated with the identified channel to the client device via the computer network without redirection of the web page request to other URL addresses.

8. The computer system of claim 7 wherein the one or more processors also perform caching the rendered web page for future use.

9. The computer system of claim 7 wherein the each of the multiple channels is also associated with a master page.

10. The computer system of claim 7 wherein the at least one component of the user agent string contains information that identifies at least one of a user device used to generate the web page request, a geophysical location of the device used to generate the web page request, or a browser used to generate the web page request.

11. The computer system of claim 7 wherein the web page request is a hypertext transfer protocol request.

12. The computer system of claim 7 wherein the web page request identifies a cookie.

13. The computer system of claim 12 wherein the identifying the one channel includes identifying the one channel based on at least one component of the cookie.

14. The computer system of claim 7 wherein the at least one of the page layouts includes multiple panels, each of the multiple panels being associated with one of the multiple channels.

15. The computer system of claim 7 wherein the one or more processors also perform replacing the identified one channel based on one component of a user agent string with another channel from the multiple channels based on a user specified rule in a cookie.

16. A computer system, comprising one or more processors and a memory communicatively coupled to the one or more processors, the memory storing content and instructions that, when executed by the one or more processors, cause the computer system to perform:
receiving, at the computer system, multiple web page requests for content from multiple client devices via a computer network, the web page requests individually including a user agent string identifying at least one of a user device or a browser on the user device used to generate the corresponding web page request and a universal resource locator ("URL") identifying the computer system; and
in response to receiving the web page requests for the content, at the computer system,
identifying one channel from multiple available channels for each of the received web page requests based on at least one component of the corresponding user agent string, the identified channels being associated with different page layouts configured to present the same requested content, at least one of the page layouts being configured to present at least one section of the requested content wrapped in a panel;
dynamically rendering multiple different web pages each containing the same requested content by assembling the requested content from the memory in the identified page layouts associated with the identified channels; and
transmitting, from the computer system, the rendered multiple different web pages in the identified page layouts associated with the identified channels to each of the client devices via the computer network based on at least one component of the user agent string of one of the corresponding web page requests generated by the individual client devices without redirection of the web page request to other URL addresses.

17. The computer system of claim 16 wherein the web page requests each identifies a web address of the requested content.

18. The computer system of claim 16 wherein the at least one component of the user agent string identifies at least one of a user device used to generate the web page request or a browser used by the user device to generate the web page request.

19. The computer system of claim 16 wherein the at least one section of the content is wrapped in the panel associating the at least one section of the content to one of the identified channels.

20. The computer system of claim 16 wherein the at least one component of the user agent string identifies at least one of a user device used to generate the web page request, and wherein the method further includes communicating the rendered web pages to the corresponding user devices identified in the user agent strings.

* * * * *